United States Patent [19]

Watson, Sr. et al.

[11] 4,326,963

[45] Apr. 27, 1982

[54] MULTIPLE BED FILTERING APPARATUS AND PROCESS

[75] Inventors: John D. Watson, Sr.; William C. Bauman, both of Lake Jackson, Tex.

[73] Assignee: The Dow Chemical Company, Midland, Mich.

[21] Appl. No.: 184,680

[22] Filed: Sep. 8, 1980

[51] Int. Cl.³ .................... B01D 23/16; B01D 23/24; B01D 46/30

[52] U.S. Cl. .................................... 210/792; 55/96; 55/98; 55/474; 55/485; 210/793; 210/807; 210/189; 210/283; 210/284

[58] Field of Search ................ 210/669, 777, 792–798, 210/807, 189, 269, 274–276, 283, 284, 290, 503; 55/98, 482, 485, 512, 518, 519, 96, 474

[56] References Cited

U.S. PATENT DOCUMENTS

| | | | |
|---|---|---|---|
| 3,163,597 | 12/1964 | Thrun | 210/679 |
| 3,458,436 | 7/1969 | Martinola et al. | 210/275 |
| 3,737,039 | 6/1973 | Hirs | 210/792 |
| 4,157,959 | 6/1979 | Wen et al. | 210/807 |

Primary Examiner—Ivars C. Cintins
Attorney, Agent, or Firm—James H. Dickerson, Jr.

[57] ABSTRACT

A filter regeneration method comprising mixing precipitate deposited on a bed of filtering particles throughout the bed to thereby reduce the pressure drop across the filter generally occurring during use. Regeneration is conveniently accomplished by fluidizing the precipitate and filtering particles into another portion of the filter. Two types of apparatus are described in which the regeneration method may be used.

10 Claims, 6 Drawing Figures

MULTIPLE BED FILTERING APPARATUS AND PROCESS

BACKGROUND OF THE INVENTION

This invention relates to a filtering method and an apparatus to filter solid impurities from fluids.

One of the most common types of filters is the bed filter. Such a filter may be used in gravity flow or pressurized systems. In a gravity flow bed filter, a fluid (usually a liquid) is fed to the upper surface of the filter media and the flow of the liquid through the bed is promoted by gravity. As the liquid flows through the filter media, suspended solids are trapped and precluded from passing through the media, thus filtering and purifying the liquid. In a pressure system, the fluid (either liquid or gas) is forced to pass through the filter because of the pressure exerted on the fluid. In a pressure system, the fluid may flow in any direction; upward, downward or in a generally horizontal direction. Consequently, the pressurized system is not limited to the downward flow as is the gravity filter. Otherwise, a pressure filter works in a manner almost identical to that of the gravity filter. The fluid flows through a filter media, where the suspended solids are trapped, while the fluid passes through the media. Pressure filters may be built more compactly to accommodate a given flow rate of fluid. Another difference is the fact that both gases and liquids may be filtered in a pressure filter, while only liquids may be filtered in a gravity filter.

With both types of filters, as fluids are being filtered, a layer of the filtered material (precipitate) accumulates on the filter media. This precipitate continues to build up, causing an increasingly greater pressure drop across the filter. After a period of time, the pressure drop becomes unacceptably high. Generally, the high pressure-drop problem is solved by employing a process known as "backwashing", i.e., the flow of the fluid through the filter is reversed. Such a reversal causes a large portion of the precipitate to be removed from the surface of the filter media, thus reducing the pressure drop across the filter. If the backwashed material is again run through the filter, the precipitate immediately builds up on the filter surface again and the pressure-drop across the filter rapidly increases to about the original unacceptable level. To avoid this rapid pressure increase, the backwashed material is usually removed from the filtering system.

SUMMARY OF THE INVENTION

The present inventive method of regenerating a particulate bed filter with particulate impurities therein comprises mixing the filtering particles with the precipitate particles to form an admixture. The mixture is then formed into a bed wherein the precipitate particles are distributed among the filtering particles.

This regeneration method reduces the pressure drop across the filter as compared to the pressure drop before the regeneration. Two types of devices are described which may be used as a filter in which the regeneration method may be used.

DESCRIPTION OF THE PREFERRED EMBODIMENTS

In a filtering process employing a bed of filtering material through which a fluid passes, a layer of precipitate forms on the surface of the filtering material as the fluid is filtered. This precipitate layer causes the pressure drop across the filter to increase. A method has been developed to regenerate the filter by distributing the precipitate throughout the filtering material, thus reducing the pressure drop across the filter. A preferred method includes fluidizing the filtering material and the precipitate, and allowing the mixture to settle in a manner such that the precipitate is distributed substantially throughout the filtering material.

Figure 1:
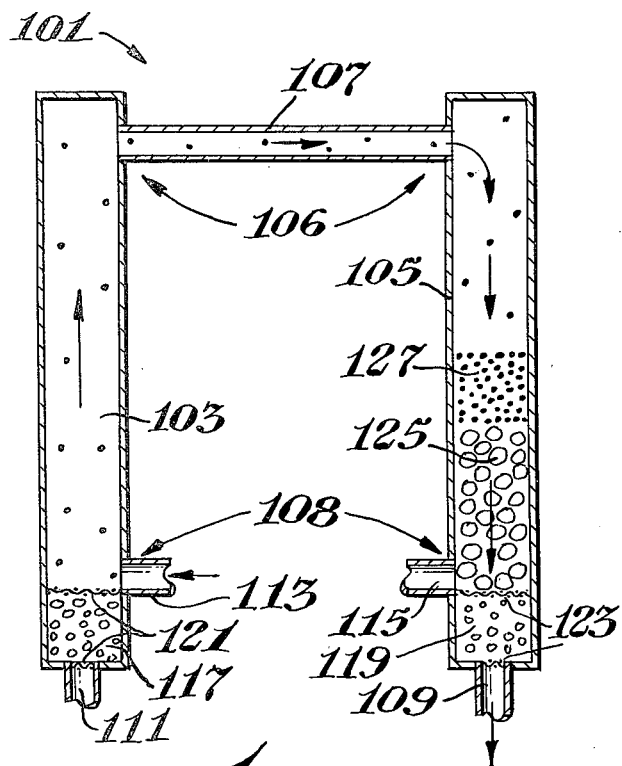
FIGS. 1, 2 and 3 show one embodiment of a device which may be used as a filter and may be regenerated using the regeneration method herein described.
Figure 2:
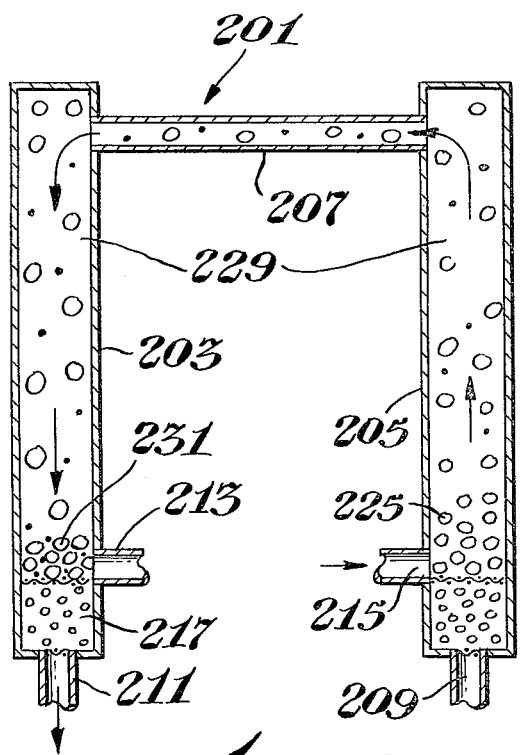
Figure 3:
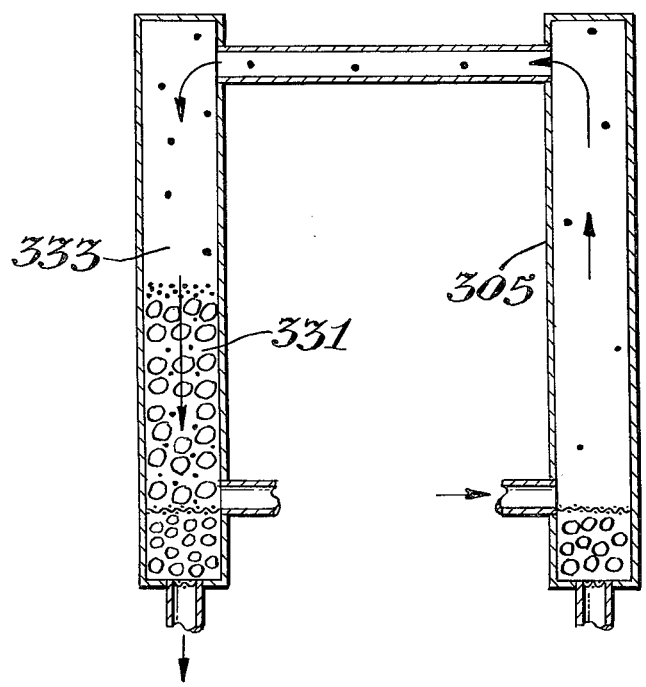

FIGS. 1, 2 and 3 illustrate an apparatus which may be used as a filter and be regenerated by the described method. A filter 101 with elongated hollow first and second sections 103 and 105, respectively, connected at a second end 106 by a passageway 107 adapted to pass a fluid, filtering particles and solid precipitate between the first and second sections. At a first end 108 of the elongated hollow sections 103 and 105, there are fluid outlets 109 and 111 and valves or other flow regulating devices (not shown) to control the flow through the outlets. The sections 103 and 105 have fluid inlets 113 and 115, respectively, and a valve or other flow regulating device to control the flow through the inlets (not shown). The fluid inlets 113 and 115 are located in sections 103 and 105 between the respective fluid outlets 109 or 111 and the passageway 107. The volume of the elongated hollow sections 103 and 105 between the respective fluid inlets 113 or 115 and the fluid outlets 109 or 111 are at least partially filled with filtering particles forming stationary filtering beds 117 and 119. The material comprising the stationary filtering beds 117 and 119 are of a size such that the beds are capable of filtering particulate impurities contained in a fluid to be filtered. Optionally, each of the stationary filtering beds may be held in place by restraining means 121 and 123. The restraining means may be a device such as a wire screen or other suitable restraining devices.

In operation, a first movable bed of filtering particles 125 is placed in one of the sections 103 or 105. For illustration, the first movable bed 125 is so positioned in the second section 105 to occupy at least a portion of the volume of the second section between the fluid inlet 115 and the passageway 107. The particles of the bed 125 should be of a size so that the bed can remove particulate impurities from a fluid as it flows through the bed of particles. The particles in the movable bed 125 may be of the same or different composition and size of the particles comprising the stationary beds 117 and 119.

A fluid which contains solid, particulate impurities is flowed into the filter 101. For the sake of illustration of the invention, the fluid is flowed through inlet 113 into the first section 103, through the passageway 107 and into the second section 105. The fluid is flowed through the first movable bed of filtering particles 125, through the stationary bed 119 and then out of the filter through the fluid outlet 109. The flow control devices on the fluid outlet of the first section and the fluid inlet 115 of the second section are closed during the filtering operation when the fluid passes from the section 102 through the beds 123 and 125.

As the fluid is flowed through the filter 101, at least a portion of the particulate impurities contained in the fluid are removed by the movable bed 125. As the particulate impurities are removed, they form a precipitate cake 127 at the surface of the first movable bed 125. This precipitate cake 127 is composed of particles generally smaller in physical size than the particles comprising the first movable bed of filtering particles 125. As more fluid is filtered, the thickness of the precipitate cake 127 increases. As the precipitate cake 127 increases in thickness, the fluid flow through the bed 125 decreases and the pressure drop across the filter increases.

The pressure drop across the filter 101 may be decreased by regenerating the filter. FIG. 2 shows the filter 201 being regenerated. Flow control devices on the fluid outlet 209 of the second section 205 (not shown) and on the fluid inlet 213 of the first section 203 (not shown) are closed during the regeneration while the fluid is flowed into the second section 205 of the filter 201 through fluid inlet 215. The fluid should be flowed through the second section 205 at a rate sufficient to fluidize the material comprising the first movable bed of filtering material 225 and the particles comprising the precipitate cake and form a fluid-precipitate/filtering-particle admixture 229. The admixture 229 is flowed through the passageway 207 and into the first section 203. The admixture is flowed through first section 203 to and through stationary bed 217 and out of the filter through the fluid outlet 211. As the admixture flows through the first stationary bed 217, the particulate material in the admixture is filtered from the fluid, forming a second movable bed of filtering particles 231. The second movable bed of filtering material 231 is a mixture of the particles from the first movable bed of filtering particles (FIG. 1, 125) and the particles from the precipitate cake (FIG. 1, 127). The two types of particles are intermixed. This distribution of the two types of particles after regeneration, as opposed to the layer formation of the two types of particles before regeneration, results in the pressure drop across the filter being reduced.

FIG. 3 shows that the flow of the fluid may be continued and that particulate impurities will be removed from the fluid forming a precipitate cake 333. When further regeneration of the filter is desired, the regeneration process described above may be repeated by directing the fluid flow in a direction which causes the second movable bed of particles 331 and the precipitate cake 333 to be moved back into the second section 305 to form a third movable bed of filtering particles, wherein the filtering particles and the precipitate particles are admixed. The regeneration procedures may be repeated as many times as desired.

Figure 4:
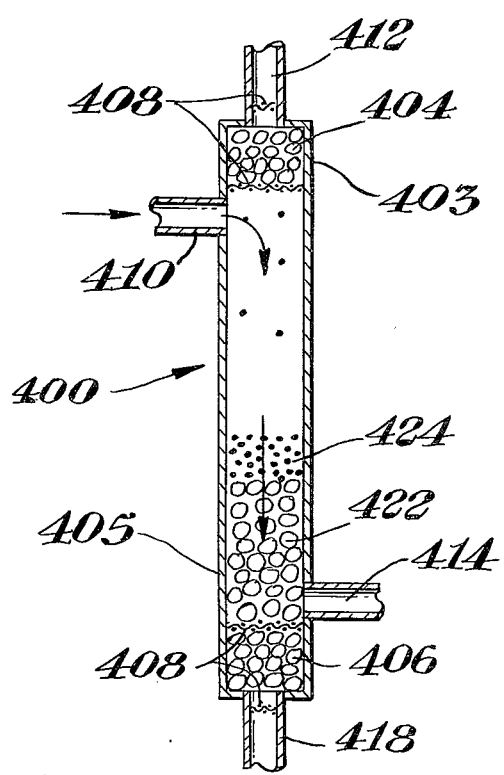
FIGS. 4, 5 and 6 show a second embodiment of a filter useful in the herein described method.
Figure 5:
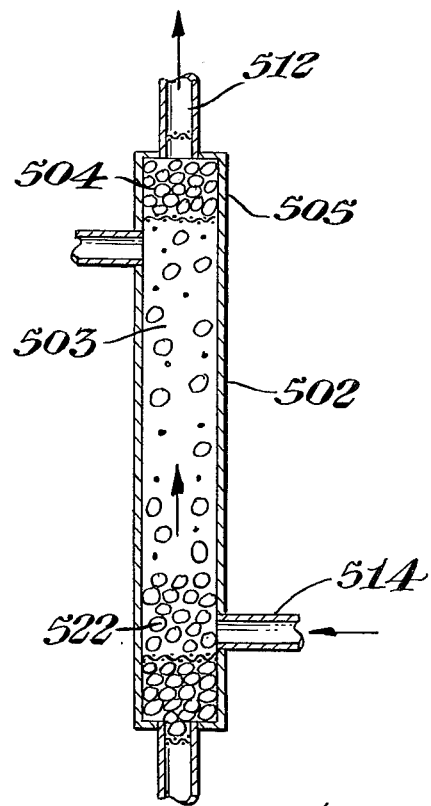
Figure 6:
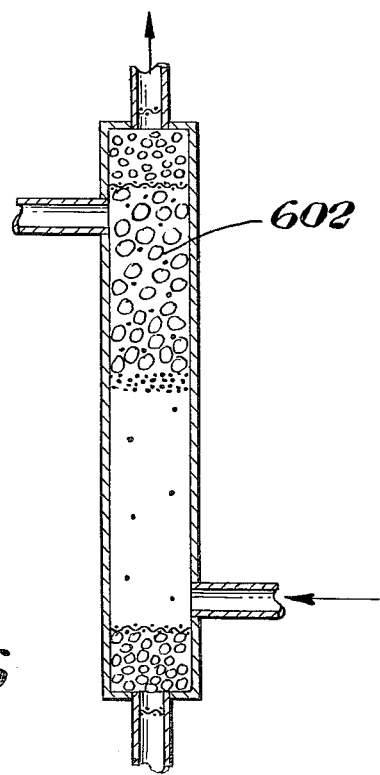

FIGS. 4, 5 and 6 illustrate another embodiment of an apparatus which may be used as a filter in which the present regeneration method may be used.

FIG. 4 shows a filter 400 with one section 402. At a first end 403 of the section 402, there is placed a first stationary bed of filtering particles 404 and at a second end 405 of the section 402 is placed a second stationary bed of filtering particles 406. Each stationary bed is held in place by restraining means 408 and 409, such as a wire screen or a similar restraining-type apparatus. There is a first fluid inlet and a first fluid outlet, 410 and 412, respectively, at the first end 403 of the section 402 and a second fluid inlet 414 and a second fluid outlet 418 at the second end 405. Each fluid inlet and each fluid outlet has a flow regulating means (not shown) by which the flow may be controlled or stopped.

A first movable bed of filtering particles 422 is inside section 402. The bed 422 occupies at least a portion, but not all, of the volume of the section 402 located between the first stationary bed 404 and the second stationary bed 406. In operation of the filter, the location of the movable bed of filtering particles 422 depends upon the direction of the flow of a fluid containing particulate impurities. For illustrative purposes, the fluid is flowed into the filter 400 through the first fluid inlet 410 and then through the section 402 to the surface of the first movable bed of filtering particles 422. The fluid is flowed through the first movable bed 422, through stationary bed 406 and then out of the filter through fluid outlet 418. As the fluid passes through bed 422, particulate impurities contained in the fluid are at least partially removed and form a precipitate cake 424 at the surface of the bed 422. When regeneration is desired, the flow direction of the fluid is changed, as shown in FIG. 5, so that the fluid enters the filter through the second fluid inlet 514, passes through the movable bed of filtering particles 522, through the section 502, through the first stationary bed of filtering particles 504 and exits the filter 502 through the first fluid outlet 512. The fluid is flowed at a rate sufficient to fluidize at least a portion of and preferably substantially all of the bed of filtering particles 522 and the particles comprising the precipitate cake forming an admixture 503. The direction of the fluid flow and its velocity forces the filtering particles and the precipitate cake particles toward the first end 505 of the section 502.

As the flow of fluid is continued, the admixture forms a second bed of movable particles 602, as shown in FIG. 6. In the second bed of particles 602, the precipitate particles are distributed throughout at least a portion of the second movable bed of particles 602. This distribution results in the pressure drop through the filter being reduced as compared to the pressure drop through the filter prior to regeneration.

There are other devices which may be used to practice the invention and the two examples shown do not limit the type which may be used. Rather, they merely serve to illustrate the fact that the pressure drop across a bed filter may be decreased by regenerating the filter using a method which results in a distribution of the precipitated particles, throughout at least a portion of the particles comprising a bed of filtering particles.

Likewise, any method used to distribute the precipitate throughout the filtering bed is contemplated by the present invention.

Optionally, the fluid inlet and the fluid outlet may connect to the section through one conduit. In such a design, the fluid should be flowed through a stationary bed of filtering particles on its way into a filter or as the fluid exits a filter.

Any fluid which is in a liquid state or a gaseous state and has particulate impurities to be removed and which is compatible, i.e., nonreactive with the filtering particles and with the exposed surface of the filter, may be successfully filtered.

Any particulated material which may be fluidized and is nonreactive with the fluid being filtered and with the filter body itself may comprise the stationary beds of filtering particles and may comprise the movable bed of filtering particles. For example, sand and various ion exchange resins are particularly well suited as filtering particles.

The following examples illustrate the invention:

EXAMPLE 1

Two clear plastic tubes with an inner diameter (I.D.) of 2 inches were connected at one end by a piece of ½ inch I.D. tube as shown in FIG. 1. About 4 inches of 20-35 mesh sand was placed in the bottom of each column forming a stationary bed of filtering particles. This was covered with 12 inches of 50-100 mesh ion exchange resin which acts as the movable bed of filtering particles. River water with an average solids content of 25-150 parts per million (ppm) was flowed through the filter. The test was run in accordance with the description given concerning FIGS. 1-3. The test ran for 16 days, during which time the filter was regenerated approximately every 30 minutes by fluidizing the movable bed of filtering particles and the precipitate particles and flowing the particulate mixture into the opposite section, and forming a new movable bed of filtering particles wherein the fluidized precipitate particles were distributed throughout at least a portion of the new bed. Regeneration reduced the pressure drop in each case. The solids content of the river water was reduced to an average of 2 ppm. The average flow rate of the river water was 20 gallons per minute per square foot (gpm/ft$^2$) of resin area (0.43 gallons per minute).

EXAMPLE 2

The filter and procedures described in Example 1 were used to filter a saturated NaCl aqueous brine solution having a solids content of 350 ppm. The flow rate of the brine was 7 gpm/ft$^2$. The flow from the filter contained less than 2 ppm solids. The filter was regenerated about every 30 minutes throughout the run. After each regeneration, the pressure drop was reduced.

What is claimed is:

1. An apparatus for filtering solids from a fluid which comprises:
   (a) two hollow elongated sections, a primary section and a secondary section, wherein each section is adapted to contain a fluid and each having a first end and a second end;
   (b) a means connecting the first end of the primary section with the first end of the secondary section and adapted to transmit a fluid and a plurality of particles between the sections;
   (c) a primary stationary bed of filtering particles occupying a portion of the hollow interior of the primary section;
   (d) means for retaining the primary stationary bed of filtering particles in place;
   (e) a secondary stationary bed of filtering particles occupying a portion of the hollow interior of the secondary section;
   (f) means for retaining the secondary stationary bed of filtering particles in place;
   (g) a movable bed of filtering particles positioned in at least a portion of one section between the stationary bed of filtering particles of that section and the means to connect the section;
   (h) a first conduit adapted to pass a fluid into or out of the primary section and attached adjacent to the primary stationary bed of filtering particles; and
   (i) a second conduit adapted to pass a fluid into or out of the secondary section and attached adjacent to the secondary stationary bed of filtering particles.

2. An apparatus for filtering solids from a fluid which comprises:
   (a) a hollow elongated section adapted to contain a fluid and having a first end and a second end;
   (b) a first conduit adapted to pass a fluid into or out of the section connected to the first end of the section;
   (c) a second conduit adapted to pass a fluid into or out of the section connected to the second end of the section;
   (d) a first stationary bed of filtering particles occupying from about 5 to about 50 percent of the volume of the section located adjacent to the first end of the section;
   (e) means for retaining the first stationary bed in place;
   (f) a second stationary bed of filtering particles occupying less than about 50 percent of the volume of the section located adjacent to the second end of the section;
   (g) means for holding the second stationary bed in place; and
   (h) a movable bed of filtering particles located within the section and occupying a portion of the volume between the first and the second beds of filtering particles.

3. The apparatus of claims 1 or 2 where the filtering material in the movable bed is ion exchange resin particles.

4. The apparatus of claims 1 or 2 where the filtering particles in the stationary beds are sand particles.

5. A method of filtering a solid from a fluid in a filter which comprises at least one hollow elongated section adapted to contain a fluid; a conduit adapted to pass a fluid into and out of the section; a movable bed of filtering particles located within the section and occupying a portion of the volume of the section; a means for flowing a solids-containing fluid into the section; and a means for flowing the fluid out of the section; said method comprising:
   (a) flowing a solids-containing fluid into the section and through the movable bed of filtering particles wherein at least a portion of the solids are removed and form a precipitate on the movable bed of filtering particles; and
   (b) mixing substantially all of the precipitate with the movable bed of filtering particles to distribute the precipitate throughout at least a portion of the movable bed of filtering particles;
   (c) forming the precepitate-filtering particle mixture into a second movable bed of filtering particles; and
   (d) repeating step (a).

6. A method of regenerating a bed filter comprising:
   (a) flowing a fluid, which contains precipitate particles, through a bed of filtering particles;
   (b) removing at least a portion of the precipitate particles by filtration;
   (c) depositing said precipitate particles onto the bed of filtering particles;
   (d) substantially stopping the flow of fluid through the bed of filtering particles;
   (e) mixing the filtering particles with substantially all of the precipitate particles;
   (f) forming the mixture into a second bed of filtering particles; and
   (g) repeating step (a).

7. A method of regenerating a bed filter comprising:
   (a) flowing a fluid which contains precipitate particles, through a bed of filtering particles;
   (b) removing at least a portion of the precipitate particles by filtration;

(c) depositing said precipitate particles onto the bed of filtering particles;

(d) reversing the direction of fluid flow through the bed of filtering particles;

(e) at least partially fluidizing the bed of filtering particles and precipitate particles;

(f) forming the fluidized filtering particles and substantially all of the precipitate particles into a second bed of filtering particles; and (g) repeating step (a).

8. The method of claims 6 or 7 where the fluid is a liquid.

9. The method of claims 6 or 7 where the fluid is a gas.

10. The method of claims 6 or 7 where the steps are sequentially repeated.

* * * * *